United States Patent [19]

Ross et al.

[11] Patent Number: 4,471,274

[45] Date of Patent: Sep. 11, 1984

[54] VEHICLE DOOR CONTROL APPARATUS

[75] Inventors: Steven L. Ross, Upper St. Clair; Lewis C. Marascalco, Pleasant Hills, both of Pa.

[73] Assignee: Westinghouse Electric Corp., Pittsburgh, Pa.

[21] Appl. No.: 381,258

[22] Filed: May 24, 1982

[51] Int. Cl.³ .............................................. H02H 7/85
[52] U.S. Cl. .................................. 318/282; 318/309; 318/463
[58] Field of Search .............................. 318/461-468, 318/309-313, 318, 326, 281, 282

[56] References Cited

U.S. PATENT DOCUMENTS

| | | | |
|---|---|---|---|
| 2,992,378 | 7/1961 | Schneider | 318/469 |
| 3,775,750 | 11/1973 | Woods. | |
| 3,845,375 | 10/1974 | Stiebel | 318/463 |
| 4,035,702 | 7/1977 | Pettersen et al. | 318/467 |
| 4,145,728 | 3/1979 | Royer | 318/463 |
| 4,234,833 | 11/1980 | Barrett | 318/468 |
| 4,263,536 | 4/1981 | Lee et al. | 318/266 |
| 4,269,377 | 5/1981 | Rush et al. | |

OTHER PUBLICATIONS

R. C. Hoyler, Automatic Train Control, Sep. 1972, pp. 145-152.
B. L. Costa, Sao Paulo Metro E. W. Line Inovations, Oct. 10, 1977, pp. 1107-1109.
T. C. Selis, Atlanta Airport People Mover, 3/22/78, pp. 1-10.
J. R. Tucker, Skybus to Orlando, 3-28-79, pp. 1-7.
McDonald, App. of Microprocessor, 3-28-79, pp. 1-9.

Primary Examiner—J. V. Truhe
Assistant Examiner—A. Evans
Attorney, Agent, or Firm—R. G. Brodahl

[57] ABSTRACT

A passenger vehicle door obstruction sensing control apparatus includes a first time period that begins when a door close command signal is received and the vehicle doors start to close. This first time period permits the door drive motor to reach a steady-state speed of operation. Then a motor speed responsive signal is provided to a speed reduction sensing apparatus for opening the doors for a second time period whenever the motor speed reduces below a predetermined limit.

6 Claims, 6 Drawing Figures 4,471,274

VEHICLE DOOR CONTROL APPARATUS

BACKGROUND OF THE INVENTION

It is known in the prior art to provide a passenger vehicle door control apparatus including a programmed microcomputer control apparatus responsive to open door code signals from the vehicle roadway track wayside as disclosed in U.S. Pat. No. 4,269,377.

In an article entitled "Passenger Transfer System Will Take the Long Walk Out of Air Travel", published in the Westinghouse Engineer for January 1969 at pages 9–15, there is described a door control apparatus for the passenger vehicles operative at the Tampa International Airport and including the provision from wayside of door open and door close command signals, with the doors having safety switch edges that stop and reopen the doors if contact is made with a passenger when the doors are closing. In an article entitled "Recent Applications of Microprocessor Technology to People Mover Systems" by M. P. McDonald et al that was published in the 29th IEEE Vehicle Technology Group Conference Record for a meeting on Mar. 29, 1979 in Chicago, Ill., there is described an automatic train protection system including a relay driver responsive to a door open enable signal to control the door circuits for a desired passenger vehicle door operation in a station.

SUMMARY OF THE INVENTION

A passenger vehicle door control apparatus is provided including a single motor door operator that operates at a substantially constant speed in response to a door close command signal. The door begins to move in a closing direction and a predetermined first time period is provided for the door to reach a desired speed before the door control apparatus is enabled to control the door movement in response to an input door speed signal having a frequency in accordance with the door speed. After this first time period, if a passenger or other obstruction contacts the closing door, the door speed and the frequency of the door speed signal will reduce below a predetermined and desired substantially constant speed. The door control apparatus then provides an output pulse to move the door in an opening direction for a predetermined second time period, after which the door again moves in a closing direction until the door is closed or until another contact with an obstruction occurs.

DESCRIPTION OF A PREFERRED EMBODIMENT

Figure 1:
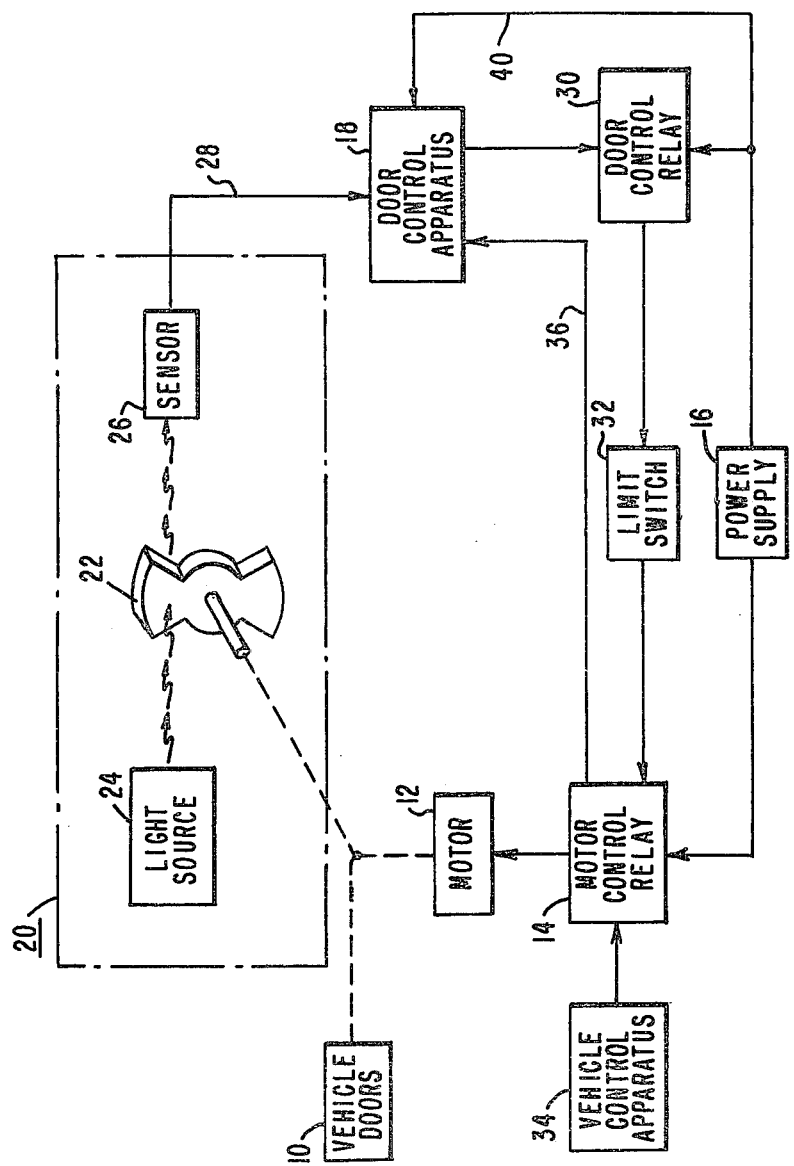
FIG. 1 shows the door control apparatus of the present invention operative to determine the movement of the vehicle doors.

In FIG. 1 there is shown the vehicle doors 10 to be opened and closed by a motor 12 as determined by the operation of a motor control relay 14 operative with a power supply 16. A door apparatus 18 is coupled with a tachometer 20 provided on the shaft of the motor 12 and includes a broken disc device 22 positioned between a light source 24 and a sensor 26, for providing a tachometer output signal on input 28 to the door control apparatus 18, which signal has a frequency proportional to the operating speed of the motor 12. The door control apparatus 18 senses a reduction in the speed of motor 12 to operate a door control relay 30 to determine the operation of motor control relay 14 through a limit switch 32. A well-known vehicle control apparatus 34, such as disclosed in U.S. Pat. No. 4,269,377 of Rush et al, provides one of a door open command signal and a door closed command signal to a motor control relay 14. The door open command signal energizes the motor control relay 14 to open the doors 10, and the door close command signal allows the motor control relay 14 to close the doors 10. The motor control relay provides a ground connection input 36 to the door control apparatus 18. When the door close command signal is provided by the vehicle control apparatus 34, the motor control relay 14 removes that ground connection 36 to initiate the operation of the door control apparatus 18. If an obstruction is present in the path of the vehicle doors 10 and causes the speed of the motor 12 to reduce below a predetermined threshold level, the door control apparatus 18 is operative through the door control relay 30 to control the motor 12 to reopen the vehicle doors 10 for a predetermined time interval and then reinitiate the effort to close the vehicle doors 10.

Figure 2:
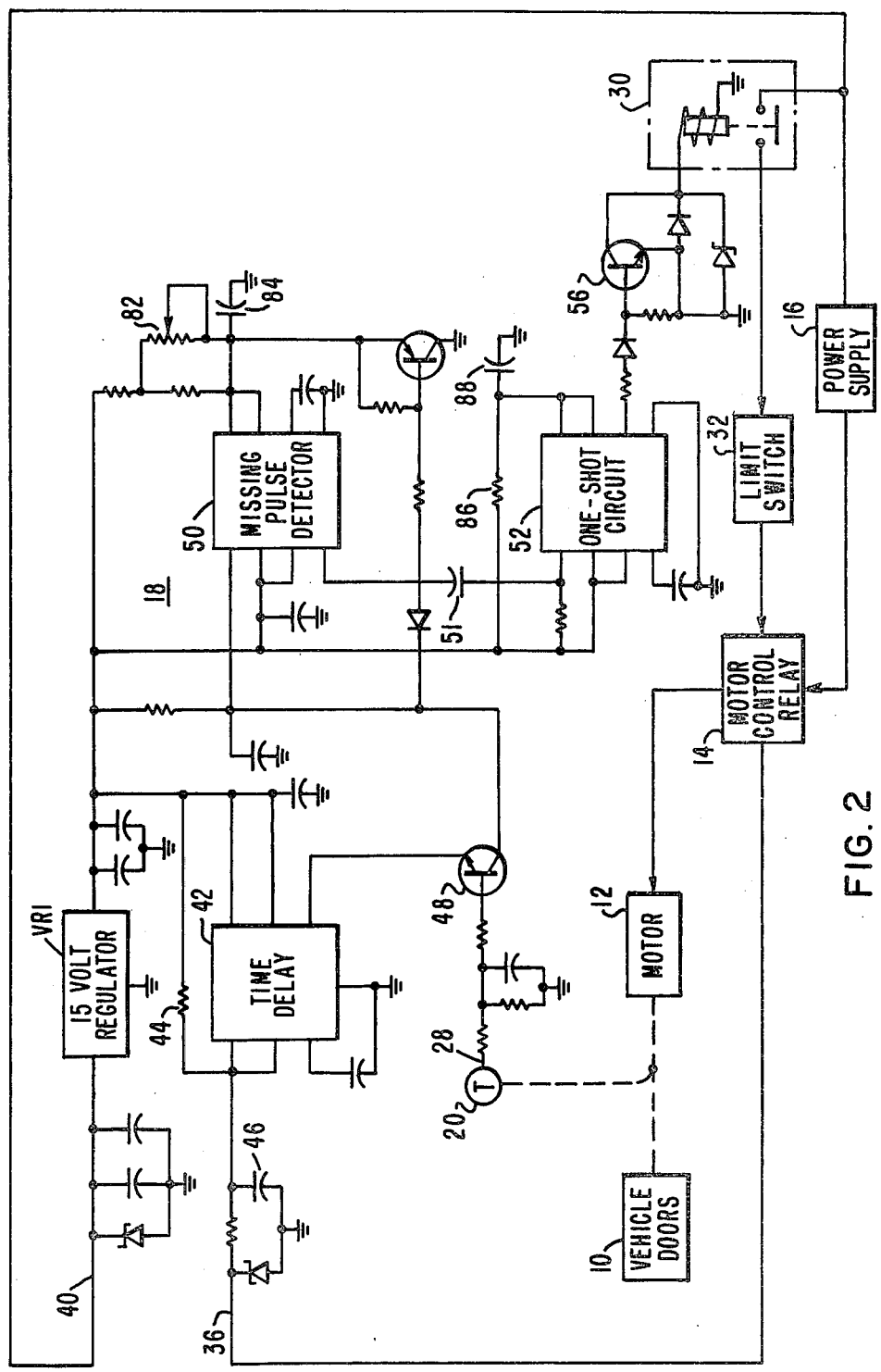
FIG. 2 shows an illustrative circuit diagram for the door control apparatus shown in FIG. 1.

In FIG. 2 there is illustrated a suitable circuit arrangement for the door control apparatus 18 shown in FIG. 1. The power supply 16 is connected to the input 40. The motor control relay 14 shown in FIG. 1 provides a ground connection to the input 36. The tachometer 20 shown in FIG. 1 is connected through the input 28 of the door control apparatus 18. When the vehicle control apparatus 34 of FIG. 1 provides a door close command signal, this operates the motor control relay 14 to remove the ground connection from input 36 of the door control apparatus 18, and this causes the time delay circuit 42 to start a predetermined time delay period determined by the resistor 44 and the capacitor 46. The output of the time delay 42 is normally high and at the end of this first predetermined time delay the output of the time delay apparatus 42 goes low. The time delay apparatus 42 is a standard Signetics SE 555 device connected as a timer circuit and available in the open market, and which is connected in accordance with the time delay circuit arrangement described at page 152 of the Signetics Applications Manual copyrighted 1979. When the output of the time delay 42 goes low, this enables the transistor switch 48 to pass the tachometer signal applied to input 26 to the missing pulse detector 50, which is also a Signetics SE 555 device and is described at page 155 of the above-referenced Signetics Applications Manual. The operation of the missing pulse detector 50 is to sense when the frequency of the tachometer output signal, which frequency is proportional to the door drive motor speed, goes below a predetermined threshold frequency. If there is no obstruction in the path of the closing vehicle doors 10 the normal tachometer frequency will remain above this predetermined threshold frequency. However, if a sufficient obstruction, such as would be provided by a vehicle passenger, is in the path of the closing doors, the frequency of the tachometer signal applied at input 28 will drop below this predetermined frequency threshold and the missing pulse detector 50 then provides an output signal to the one-shot circuit 52. The one-shot circuit is provided as a Signetics SE 555 device, and is described at page 151 of the above-referenced manual. The latter output signal passes through the amplifier 56. This output signal has a predetermined second time duration for energizing the door control relay 30 and the motor control relay 14, such that the operation of the motor 12 is now reversed for this second time duration for opening the vehicle doors 10.

Figure 3:
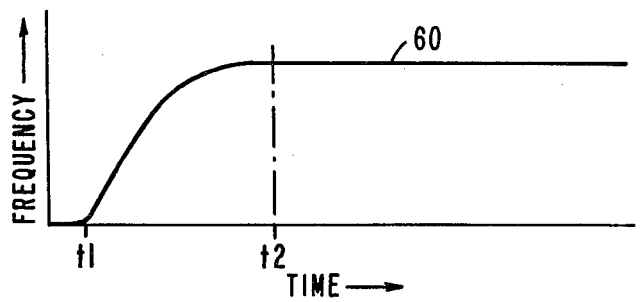
FIG. 3 is a curve showing the door motor speed reaching a substantially constant speed of operation during the first time delay period.

In FIG. 3 the curve 60 shows the tachometer output signal applied to input 28 of the door control apparatus 18 and which is proportional to the operating speed of the motor 12. At time t1 the door close command signal is received from the vehicle control apparatus 34 and starts the motor 12 operating in a direction to close the vehicle doors. The time delay circuit 42 operates to provide the time delay between time intervals t1 and t2 shown in FIG. 3 to enable the motor 12 to achieve a steady-state constant speed of operation in closing the vehicle doors. At time t2 the transistor switch 48 is enabled to pass the tachometer signal, applied to the input 28, to the missing pulse detector 50. If no obstruction occurs, the doors continue to close in accordance with the steady-state portion of the curve 60 shown in FIG. 3.

Figure 4:
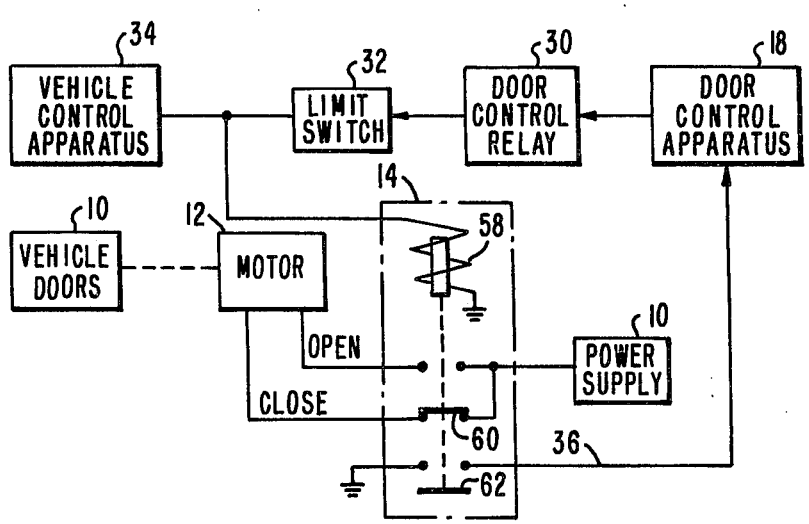
FIG. 4 illustrates the door motor operation as determined by the door control apparatus.

FIG. 4 illustrates the door motor operation as determined by the door control apparatus 18. When the vehicle control apparatus 34 provides the door close signal to the motor control relay 14, this deenergizes the winding 58 such that armature 60 lowers in position to energize the motor 12 to close the vehicle doors 10. After the first time period provided by the time delay 42, if an obstruction causes the door speed to reduce below a predetermined threshold frequency, the door control apparatus 18 provides an output signal through the door control relay 30 and the limit switch 32, which lifts the armature 60 up into contact with the upper contacts and causes the motor 12 to reverse and open the doors 10 for a predetermined time interval determined by the time period of the one-shot apparatus 52 shown in FIG. 2, after which the armature 60 again lowers and the vehicle doors close. A second armature 62 lowers with the armature 60 to remove the ground connection 63 from the input 36 to the door control apparatus 18.

Figure 5:
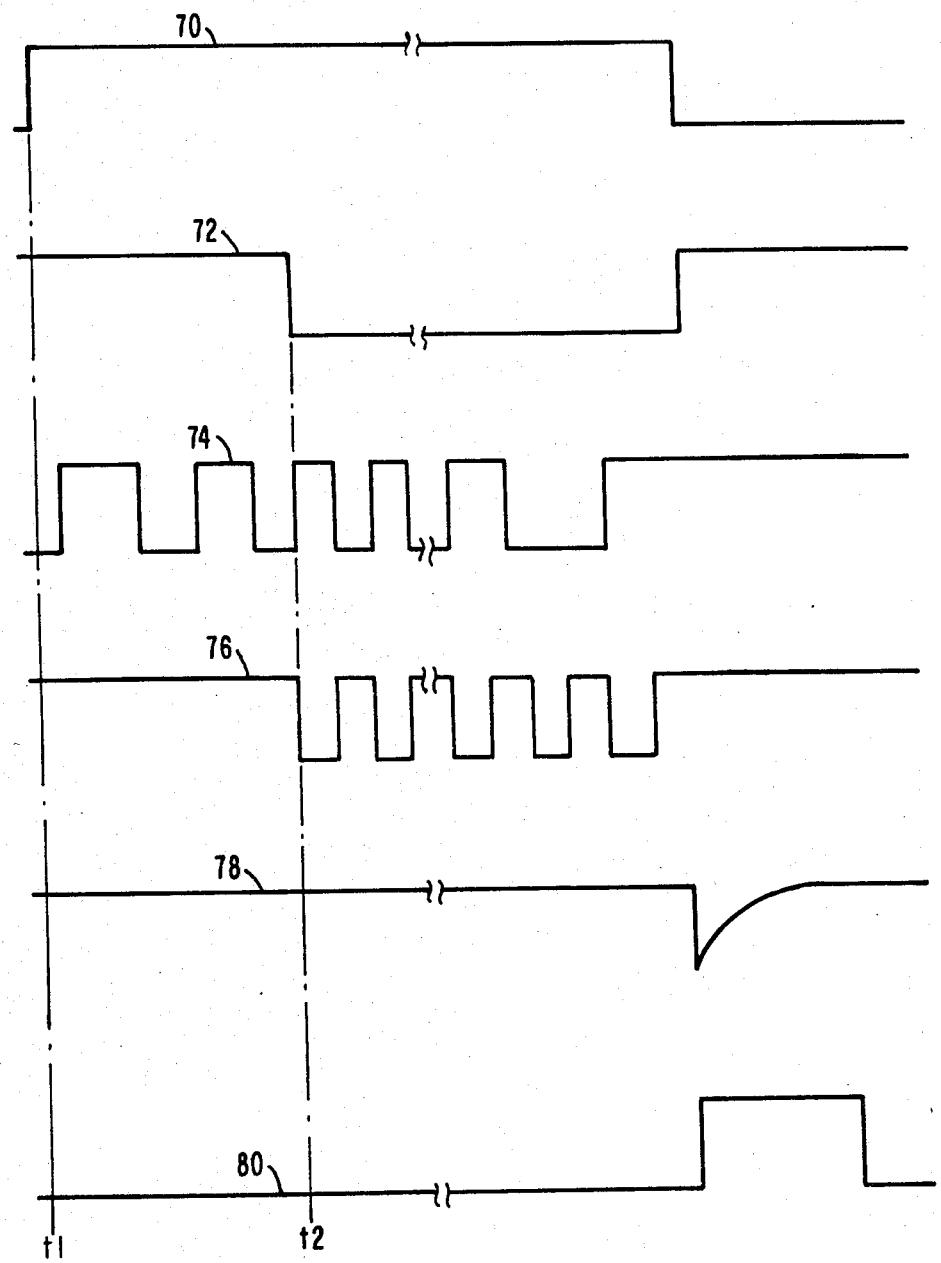
FIG. 5 illustrates the operational relationships between the door close command signal, the door motor operating speed and the resulting door control operation.

In FIG. 5 there is illustrated the operational relationships between the door close signal 70 provided to the motor control relay 14, the output signal 72 from the time delay 42, the tachometer output signal 74, the output 76 from the transistor switch 48, the output 78 from the missing pulse detector 50 after being differentiated by the capacitor 51 and the output 80 from the one-shot circuit 52. When the door close command signal is supplied by the vehicle control apparatus 34, such as would occur when it is desired to close the doors of a vehicle stopped in a passenger station, this deenergizes the winding 58 to lower the armature 60 and causes the motor 12 to close the doors 10. The armature 62 also lowers to remove the ground connection on input 36 of the door control apparatus 18. The motor control relay 14 responds to the door close signal as shown by curve 70, and removes the ground connection from input 36 connected to the time delay circuit 42. The time period t1 to t2, shown in relation to curve 72, is the time delay period provided by the time delay circuit 42, and at time t2 the output of the time delay circuit 42 goes low as shown by curve 72. When the vehicle doors 10 start moving in a closing direction, the tachometer 20 provides the output signal shown by curve 74 to the input 28 to the door control apparatus 18. When the output of the time delay circuit 42 goes low at time t2 as shown by curve 72, this enables the transistor switch 48 to pass the tachometer signal shown by curve 74 which has normally reached a steady-state motor speed by the time t2, the signal shown by waveform 76 is passed through the transistor switch 48 to the missing pulse detector 50. Thereafter if an obstruction is present in the path of the closing doors, this causes the motor speed to reduce and the frequency of the tachometer signal 74 applied at input 28 to reduce. When the frequency gets below a predetermined level, established by the resistor 82 and the capacitor 84, the missing pulse detector 50 will provide an output signal which is differentiated by the capacitor 51 and results in the signal shown by curve 78 being applied to the one-shot circuit 52. The one-shot circuit 52 then provides the output signal shown by curve 80 having a predetermined time duration, established by the resistor 86 and capacitor 88. This output signal 80 operates the door control relay 30 for energizing the winding 58 to lift the armature 60 of the motor control relay 14 to reverse the operation of the motor 12 and move the vehicle doors 10 in a direction to open the doors for the time period determined by the duration of the one-shot output pulse signal shown by curve 80.

Figure 6:
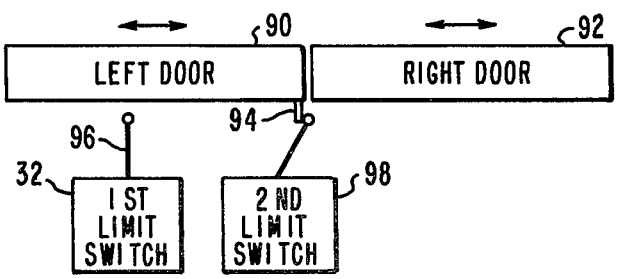
FIG. 6 illustrates the operation of the door position sensing limit switch.

In FIG. 6 there is shown the typical bifolding doors 90 and 92, of a passenger transit vehicle. The door 90 can include a control arm 94, which operates with the control member 96 of limit switch 32 that is connected between the door control relay 30 and the motor control relay 14 as shown in FIG. 1. When the control arm 94 hits the member 96 of the limit switch 32 the doors 90 and 92 are about to close such that without the limit switch 32 the obstruction circuit would otherwise respond to the resulting reduction in the tachometer signal frequency when the doors approached and became closed. Therefore, the limit switch 32 is operated by the control arm 94 to disconnect the door control apparatus 18 from the motor control relay 14 and the motor 12, and this avoids sensing this desired slowdown of the motor operation and prevents the associated undesired reopening of the doors. The limit switch 98 is suitably provided in the motor circuit to stop the operation of the motor 12 as the doors 90 and 92 become closed.

We claim:

1. In door control apparatus operative with at least one passenger vehicle door having a drive motor and responsive to a door control signal for providing movement of said door in one of an opening direction and a closing direction, the combination of:

first means responsive to said door control signal for providing a first time period after which an enable signal is provided, second means responsive to the door movement for providing a speed signal having a frequency in accordance with the movement speed of said door, third means responsive to the enable signal and the speed signal for providing a first output signal having a frequency in accordance with the frequency of said speed signal, and fourth means responsive to the frequency of said first output signal for providing a second output signal to control the operation of said doors in response to a change in the frequency of the first output signal indicating a predetermined change in the speed of the drive motor.

2. The door control apparatus of claim 1, with the first means providing the first time period for a duration permitting the drive motor to reach a desired operation and the speed signal to have a predetermined frequency before the enable signal is provided.

3. The door control apparatus of claim 1, with the first means including a time delay apparatus having a first resistor and capacitor circuit for determining the duration of the first time period.

4. The door control apparatus of claim 1, with the second output signal having a second time period for determining the amount of door movement in the other of said opening and closing directions.

5. The door control apparatus of claim 1, with said first time delay providing a predetermined door movement in one of said opening and closing directions and with the second output signal providing a predetermined door movement in the other of said opening and closing directions.

6. The door control apparatus of claim 1, with the fourth means being responsive to the frequency of the first output signal indicating a door movement below a predetermined threshold speed.

* * * * *